Sept. 22, 1970  K. A. WHEELER  3,529,675

DISK GANG COUPLING

Filed Sept. 13, 1967  2 Sheets-Sheet 1

Inventor
Keith A. Wheeler
By Kenneth␣␣␣␣␣␣␣
Attorney

Sept. 22, 1970  K. A. WHEELER  3,529,675
DISK GANG COUPLING

Filed Sept. 13, 1967  2 Sheets-Sheet 2

Inventor
Keith A. Wheeler
By Kenneth Chickver
Attorney

United States Patent Office 3,529,675
Patented Sept. 22, 1970

---

3,529,675
DISK GANG COUPLING
Keith A. Wheeler, West Allis, Wis., assignor to Allis-Chalmers Manufacturing Company, Milwaukee, Wis.
Filed Sept. 13, 1967, Ser. No. 667,604
Int. Cl. A01b 21/08; F16d 1/00
U.S. Cl. 172—568                                   5 Claims

ABSTRACT OF THE DISCLOSURE

An improved disk harrow having an extension including coupling means for providing a driving connection between the extension and disk harrow.

---

This invention relates generally to agricultural implements and more particularly to improvements in foldable disk gang extensions which may be secured in their extended working position and coupled to an adjacent main frame gang so as to rotate as a single unit.

It is the general practice in wide disk harrows to provide the central main harrow section with foldable extension gangs to extend the overall width of the harrow when in operation and to reduce the width of the harrow for transport or deep tillage purposes.

One of the problems encountered in disk harrows of this type has been the independent rotative action between the main disk gang and the foldable extension disk gang. This resulted in undesirable plugging of the blades with trash and irregularity in the working of the soil.

The purpose of the present device is to provide a releasable coupling between the extension gang and the main gang which serves to unite the two gangs so that rotative motion is transmitted between the assemblies to operate the two gangs in unison. This also applies to nonfolding split gangs when the gang consists of two units with separate gang bolts.

The prior art teaches the use of a pair of coaxially arranged disk gangs having a male coupling member associated with one gang and a female coupling member associated with the other gang. Both coupling members are provided with internally mating surfaces configured to transmit driving torque from one gang to the other. This internal socket type connection has the following disadvantages: (1) Requires a close fit. Fold-up disk harrow gangs are swung on an arc about a fixed pivot or hinge thereby limiting the amount of socket engagement and requiring adequate internal clearance to achieve the connection. The looseness necessitated by the arcuate engagement and manufacturing tolerances results in the driving torque being transmitted through line contact which tends to Brinell through use, thereby compounding deterioration of the fit to further reduce the effectiveness of the driving connection. (2) Requires the disk gangs to be concentric. Any misalignment or eccentricity between gangs makes the connection difficult to achieve and results in abnormal stress and wear. Whereas, in the present improved connection the torque is transmitted through face or surface contact where the necessary clearance for ease of engagement has no detrimental effect on wear life or ability to transmit torque from one gang to the other.

Some misalignment between the two gangs is permissible without affecting its successful operation, thereby reducing manufacturing tolerances and costs.

These and other advantages will become more apparent when a detailed description of a single embodiment is made which is best understood when considered with the drawings, in which.

Figure 1:
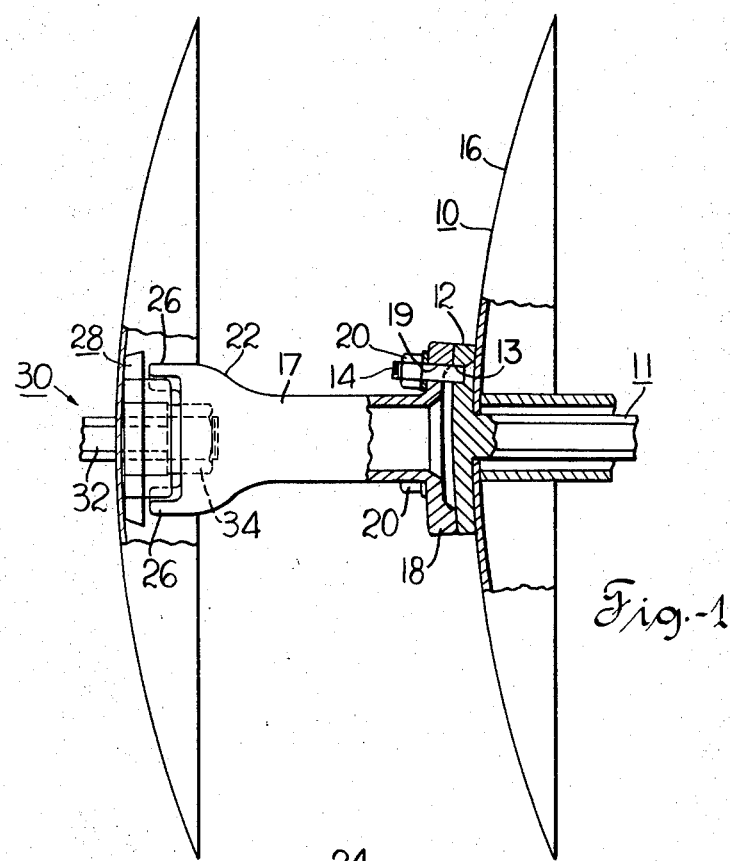
FIG. 1 is a side elevation view of a portion of a disk harrow and a portion of an extension attached thereto.
Figures 2, 3:
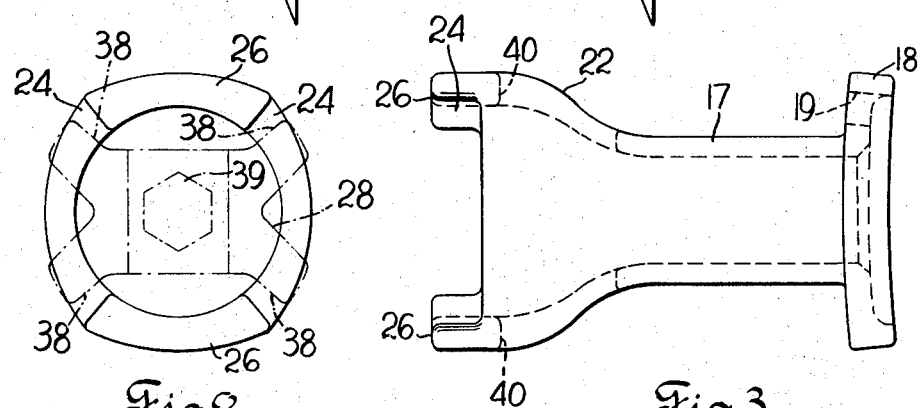
FIG. 2 is an enlarged front view of the connector casting, with a drive washer superimposed on the connector to show the driving connection.
FIG. 3 is a side elevation view of the connector casting.
Figures 4, 5:
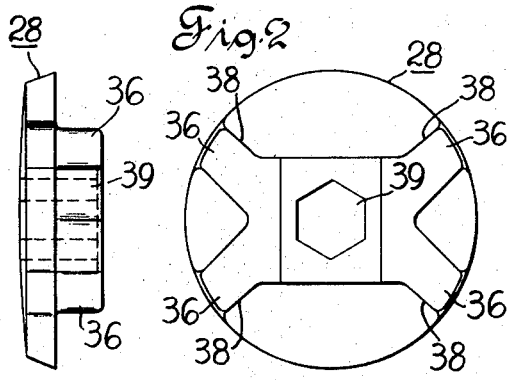
FIG. 4 is an enlarged side elevation view of the drive washer.
FIG. 5 is a front view of the drive washer.

Referring now to FIG. 1, the main disk gang generally indicated at 10, is provided with a gang bolt 11 having a washer 12 rigidly secured, as by welding (not shown) to its outer end. Three equally spaced openings 13 are provided in the gang bolt washer 12 to receive plow bolts 14 which have heads shaped to prevent axial movement therebetween. A connector member 17 having an inner flange 18 with similarly spaced openings 19 is assembled on the bolts 14 and rigidly secured to the main gang 10 by means of nuts 20.

The outer bell-shaped end 22 of the connector casting 17 is provided with two identical positioned diametrically opposite slots 24. These slots terminate in radially extending abutment portions 26. A washer 28 is rigidly secured to the inner end of the extension gang 30 by means of gang bolt 32 and nut 34. The washer 28 is provided with an outwardly extending male portion 36 which is received by the slots 24 in the connector casting 17. The washer 28 has radial surfaces 38 which contact the radial abutment portions 26 of the connector slots 24. The radial abutment portions 26 of the connector casting 17 mating with a complemental portion 36 of the washer 28 orients and generally holds the axes of the two gangs in alignment.

The outer end 22 of the connector casting 17 is bell-shaped to provide clearance for the nut 34 thereby assuring that the drive connection is between the connector casting 17 and washer 28. Gang bolt 32 is hexagonal shaped and is received in a complementary hexagon opening 39 in washer 28 to provide a driving connection therebetween. Driving the gang by engaging the gang bolt nut 34 would be undesirable in that it would either loosen the nut or torque it too high depending on the rotation of the gang.

It should be understood that the foregoing description applies to the rear gangs of a harrow and that the parts would be reversed if applied to the front gangs of a harrow.

Openings 40 are provided in the bell-shaped end 22 of the connector casting 17 to relieve the pressure of accumulated dirt. Dirt will build up in the hollow connector casting 17 and without some relief opening, the pressure exerted by the accumulated dirt would be sufficient to force the drive connection apart and also the disk gang extension locking means 52 which might be of the type shown in the patent to Walberg, U.S. 2,972,385 issued Feb. 21, 1961, reference to which may be had if details of such locking means are desired.

Figure 6:
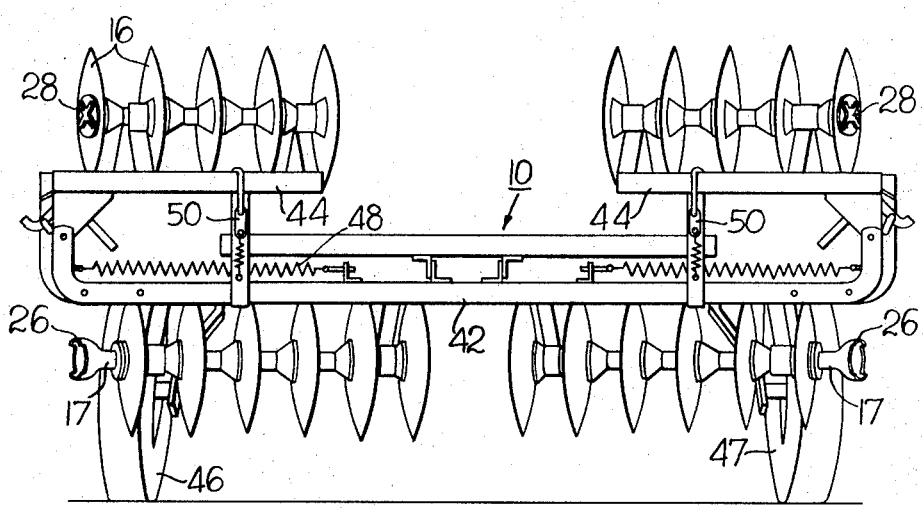
FIG. 6 is a rear view of a harrow embodying the invention with extension gangs positioned in raised position.

Referring to FIG. 6, the invention is shown as applied to a harrow 10. The harrow includes an implement frame 42, 44 shown in its folded transport position with end sections 44 folded back on frame 42; implements such as harrow disks 16 carried by implement frames 42, 44; transport wheels 46 to raise and lower disks 16 relative to the ground; and a spring arrangement 48 and hold down 50 to aid in folding end sections 44 and holding it folded. End sections 44 are pivotally connected to center section for movement in a transverse vertical plane.

Figure 7:
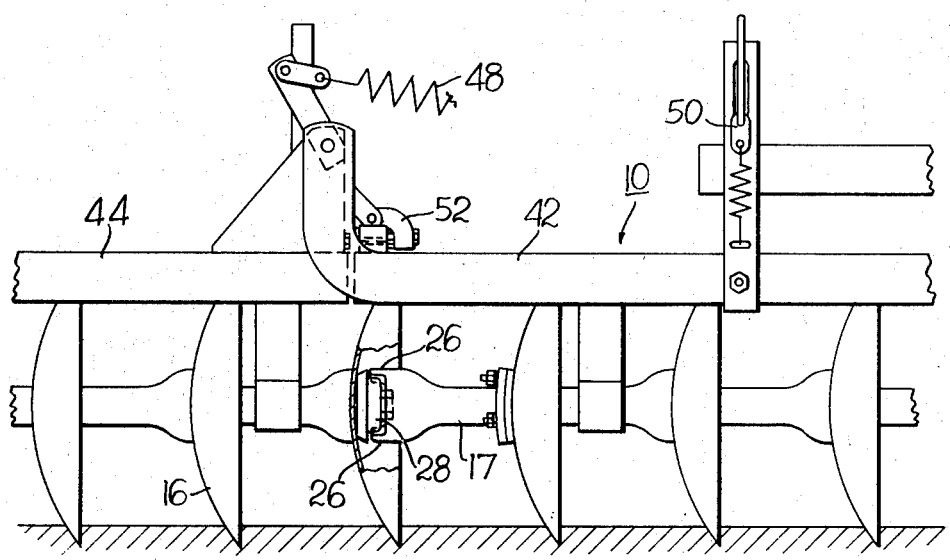
FIG. 7 is an enlarged view similar to a portion of FIG. 6 with the extension gang positioned in extended position.

When it is desired to position the end sections 44 in working position (FIG. 7) end sections 44 are pivoted downwardly to form extensions of frame 42 with jaws 26 of connector 17 mating with members 28 to provide a driving connection between gang bolts 11 and 32 (FIG. 1). Mechanism 52 for locking end section 44 in this operative position is provided but forms no part of this invention.

The embodiments of the invention in which an exclusive property or privilege is claimed are defined as follows:

1. A disk harrow having a disk gang comprising multiple disks, spacing spools between said disks, a first spindle bolt connecting said disks and spools, a first disc shaped washer attached at one end of said bolt, said washer being provided with spaced openings, the improvement comprising a gang extension pivotally attached to said disk harrow adjacent the end of said disk harrow and including multiple disks connected by a second spindle bolt, a tubular connector bolted at one end to said first washer through said openings and being provided with a first pair of jaws at the other end thereof, said jaws being provided with radially extending surfaces, a second disc shaped washer connected to the spindle bolt of said gang extension for movement therewith, said second washer being provided with a pair of jaws on an end portion thereof, said second pair of jaws being provided with radially extending surfaces complementary to said first pair of jaws with said surfaces providing the sole driving connection between the disk gang and gang extension when the gang extension is pivoted into longitudinal alignment with said disk gang.

2. The combination as recited in claim 1 and wherein said second washer being connected to said spindle bolt by means of a nut threaded on said bolt, said connector being tubular in shape and of a size so that said nut is received within said connector when said gang extension is in alignment with said disk gang.

3. The combination as recited in claim 2 and wherein said connector is provided with an opening in the side portion thereof for permitting exiting of foreign material when said gang extension is being aligned with said disk gang.

4. The combination as recited in claim 1 and wherein said connector is provided with a pair of diametrically spaced apart outstanding peripheral portions and said second washer is provided with a pair of diametrically spaced apart inset peripheral portions, said inset peripheral portions being considerably larger than said outstanding portions for readily receiving said outstanding portions when said gang is pivoted into alignment with said disk gang to provide a driving connection therebetween.

5. The combination as recited in claim 4 and wherein said outstanding portions being provided with longitudinal radial surfaces contacting complementary longitudinal radial surfaces on said second washer to provide a large area of driving contact therebetween.

References Cited

UNITED STATES PATENTS

| | | | |
|---|---|---|---|
| 431,066 | 7/1890 | Leverich | 192—108 |
| 3,102,598 | 9/1963 | Mighell | 172—568 |
| 1,266,328 | 5/1918 | Schulte | 172—599 |
| 1,958,126 | 5/1934 | Bowen. | |
| 3,370,653 | 2/1968 | Hixon | 172—599 |

ROBERT E. BAGWILL, Primary Examiner

S. C. PELLEGRINO, Assistant Examiner

U.S. Cl. X.R.

287—99